United States Patent
Folkert et al.

(10) Patent No.: US 7,734,602 B2
(45) Date of Patent: *Jun. 8, 2010

(54) CHOOSING WHETHER TO USE A DELAYED INDEX MAINTENANCE DEPENDING ON THE PORTION OF THE MATERIALIZED VIEW (MV) CHANGED

(75) Inventors: Nathaniel Keith Folkert, San Francisco, CA (US); Abhinav Gupta, Menlo Park, CA (US); Andrew Witkowski, Foster City, CA (US)

(73) Assignee: Oracle International Corporation, Redwood Shores, CA (US)

( * ) Notice: Subject to any disclaimer, the term of this patent is extended or adjusted under 35 U.S.C. 154(b) by 342 days.

This patent is subject to a terminal disclaimer.

(21) Appl. No.: 11/083,804

(22) Filed: Mar. 18, 2005

(65) Prior Publication Data

US 2005/0235003 A1 Oct. 20, 2005

Related U.S. Application Data

(60) Provisional application No. 60/562,401, filed on Apr. 14, 2004.

(51) Int. Cl.
*G06F 17/30* (2006.01)

(52) U.S. Cl. .................. 707/696; 707/610; 707/618; 707/691; 707/694; 707/713; 707/715; 707/717; 707/825; 707/830

(58) Field of Classification Search .................. 707/1, 707/3, 100, 101, 200
See application file for complete search history.

(56) References Cited

U.S. PATENT DOCUMENTS

| 4,773,862 A | 9/1988 | Baba |
| 5,261,098 A | 11/1993 | Katin et al. |

(Continued)

FOREIGN PATENT DOCUMENTS

JP   05104972   4/1993

OTHER PUBLICATIONS

Gopalkrishnand, Vivikanand, et al. "Issues of Object-Relational View Design in Data Warehousing Environment," IEEE 1998, 0780347781, pp. 2732-2737.*

(Continued)

*Primary Examiner*—Etienne P LeRoux
*Assistant Examiner*—Bruce A Witzenburg
(74) *Attorney, Agent, or Firm*—Hickman Palermo Truong & Becker LLP

(57) ABSTRACT

In an embodiment, estimated costs are used to pick the best refresh technique (e.g., method) for a given MV. In another embodiment, estimated costs are used to schedule the refresh of a set MVs in an order such that overall time to refresh is reduced, or in an order that uses the smallest overall time, for refreshing when compared to other alternative refresh schedules. In another embodiment, the estimated cost of refreshing each of a set of MVs is used to select the set of CPU resources to allocate to refreshing each MV. Based on the estimated costs, the allocation of CPU resources is chosen to be more optimal (e.g., use less CPU time) than other available sets of CPU resources. In an embodiment, when refreshing an MV, delayed index maintenance is chosen if a significant portion of the base table and/or the partitions of the table has changed.

16 Claims, 5 Drawing Sheets

U.S. PATENT DOCUMENTS

| | | | |
|---|---|---|---|
| 5,276,870 | A | 1/1994 | Shan et al. |
| 5,404,506 | A | 4/1995 | Fujisawa et al. |
| 5,418,946 | A | 5/1995 | Mori |
| 5,444,842 | A | 8/1995 | Bentson et al. |
| 5,548,755 | A | 8/1996 | Leung et al. |
| 5,551,027 | A | 8/1996 | Choy et al. |
| 5,560,005 | A | 9/1996 | Hoover et al. |
| 5,581,758 | A | 12/1996 | Burnett et al. |
| 5,584,024 | A | 12/1996 | Shwartz |
| 5,594,899 | A | 1/1997 | Knudsen et al. |
| 5,598,559 | A | 1/1997 | Chaudhuri |
| 5,600,831 | A | 2/1997 | Levy et al. |
| 5,659,728 | A | 8/1997 | Bhargava et al. |
| 5,701,455 | A | 12/1997 | Bhargava et al. |
| 5,724,575 | A | 3/1998 | Hoover et al. |
| 5,729,730 | A | 3/1998 | Wlaschin et al. |
| 5,734,884 | A | 3/1998 | Eberhard et al. |
| 5,745,904 | A | 4/1998 | King et al. |
| 5,765,147 | A | 6/1998 | Mattos et al. |
| 5,774,692 | A | 6/1998 | Boyer et al. |
| 5,778,353 | A | 7/1998 | Schiefer et al. |
| 5,778,355 | A | 7/1998 | Boyer et al. |
| 5,812,840 | A | 9/1998 | Shwartz |
| 5,822,751 | A | 10/1998 | Gray et al. |
| 5,826,077 | A | 10/1998 | Blakeley et al. |
| 5,832,485 | A | 11/1998 | Chaudhry |
| 5,848,405 | A | 12/1998 | Norcott |
| 5,873,093 | A | 2/1999 | Williamson et al. |
| 5,875,447 | A | 2/1999 | Goel et al. |
| 5,897,632 | A | 4/1999 | Dar et al. |
| 5,950,210 | A | 9/1999 | Nelson |
| 5,956,706 | A | 9/1999 | Carey et al. |
| 5,960,426 | A | 9/1999 | Pirahesh et al. |
| 5,960,427 | A | 9/1999 | Goel et al. |
| 5,963,933 | A | 10/1999 | Cheng et al. |
| 5,963,959 | A | 10/1999 | Sun et al. |
| 5,970,482 | A | 10/1999 | Pham et al. |
| 5,974,407 | A | 10/1999 | Sacks |
| 5,974,416 | A | 10/1999 | Anand et al. |
| 5,978,788 | A | 11/1999 | Castelli et al. |
| 5,978,791 | A | 11/1999 | Farber et al. |
| 5,987,455 | A | 11/1999 | Cochrane et al. |
| 5,991,754 | A | 11/1999 | Raitto et al. |
| 6,003,022 | A | 12/1999 | Eberhard et al. |
| 6,006,216 | A | 12/1999 | Griffin et al. |
| 6,023,695 | A | 2/2000 | Osborn et al. |
| 6,026,390 | A * | 2/2000 | Ross et al. ............... 707/2 |
| 6,032,144 | A | 2/2000 | Srivastava et al. |
| 6,088,705 | A | 7/2000 | Lightstone et al. |
| 6,108,651 | A | 8/2000 | Guha |
| 6,125,360 | A | 9/2000 | Witkowski et al. |
| 6,134,543 | A | 10/2000 | Witkowski et al. |
| 6,199,063 | B1 | 3/2001 | Colby et al. |
| 6,205,451 | B1 * | 3/2001 | Norcott et al. ............ 707/204 |
| 6,272,502 | B1 | 8/2001 | Lieuwen et al. |
| 6,289,335 | B1 * | 9/2001 | Downing et al. ............ 707/3 |
| 6,334,128 | B1 * | 12/2001 | Norcott et al. ............ 707/5 |
| 6,339,769 | B1 * | 1/2002 | Cochrane et al. ............ 707/2 |
| 6,356,889 | B1 * | 3/2002 | Lohman et al. ............ 707/2 |
| 6,356,890 | B1 * | 3/2002 | Agrawal et al. ............ 707/2 |
| 6,356,891 | B1 * | 3/2002 | Agrawal et al. ............ 707/2 |
| 6,374,263 | B1 | 4/2002 | Bunger |
| 6,457,020 | B1 | 9/2002 | Carey et al. |
| 6,473,201 | B1 | 10/2002 | Sato |
| 6,477,525 | B1 | 11/2002 | Bello et al. |
| 6,480,836 | B1 | 11/2002 | Colby et al. |
| 6,484,159 | B1 | 11/2002 | Mumick et al. |
| 6,493,699 | B2 | 12/2002 | Colby et al. |
| 6,493,701 | B2 | 12/2002 | Ponnekanti |
| 6,496,819 | B1 | 12/2002 | Bello et al. |
| 6,496,828 | B1 * | 12/2002 | Cochrane et al. ............ 707/10 |
| 6,546,402 | B1 | 4/2003 | Beyer et al. |
| 6,560,476 | B1 | 5/2003 | Pelletier et al. |
| 6,629,094 | B1 | 9/2003 | Colby et al. |
| 6,741,997 | B1 | 5/2004 | Liu et al. |
| 6,748,392 | B1 | 6/2004 | Galindo-Legaria et al. |
| 6,763,352 | B2 | 7/2004 | Cochrane et al. |
| 6,882,993 | B1 | 4/2005 | Lawande et al. |
| 6,957,225 | B1 * | 10/2005 | Zait et al. ............... 707/102 |
| 7,111,020 | B1 | 9/2006 | Gupta et al. |
| 7,158,994 | B1 | 1/2007 | Smith et al. |
| 2001/0013030 | A1 | 8/2001 | Colby et al. |
| 2003/0135480 | A1 * | 7/2003 | Van Arsdale et al. ............ 707/1 |
| 2003/0159136 | A1 * | 8/2003 | Huang et al. ............ 717/171 |
| 2003/0200218 | A1 | 10/2003 | Tijare et al. |
| 2004/0122828 | A1 | 6/2004 | Sidle et al. |
| 2005/0055382 | A1 * | 3/2005 | Ferrat et al. ............ 707/201 |

OTHER PUBLICATIONS

I.Kung, Chenho, "Object Subclass Hierarchy in SQL: A Simple Approach," Communications of the ACM, Jul. 1990, vol. 33, No. 7, pp. 117-125.*

Randall G. Bello et al., "Materialized Views in Oracle", VLDB '98, Proceedings of 24th International Conference on Very Large Data Bases, Aug. 24-27, 1998, New York City, New York, USA, pp. 659-664.*

Faiza Najjar et al., "Cardinality estimation of distributed join queries"; Sep. 1-3, 1999; Database and Expert Systems Applications, 1999, Proceedings, Tenth International Workshop on, pp. 66-70.*

Gianluca Moro et al., "Incremental maintenance of multi-source views", Database Conference, 2001, ADC 2001, Proceedings, 12th Australasian, Jan. 2001. oo. 13-20.*

Al-Anzi, Fawas S. et al., "Modeling behavior, a Step Towards Defining Functionally Correct Views of Complex Objects in Concurrent Engineering", CIKM '94. Gaitherburg MD, USA, 1994 ACM 089791-674-3, pp. 1-9.

Kung, Chenho, "Object Subclass Hierarchy in SQL: A Simple Approach," Communications of the ACM, Jul. 1990, vol. 33, No. 7, pp. 117-125.

Liu, Jixue et al., "Incremental maintenance of Nested Relational Views," School of Computer and Information Science, The University of South Australia, pp. 197-205.

U.S. Appl. No. 10/107,106, filed Mar. 26, 2002, Office Action Mailing Date Jun. 30,2005.

Kuno et al., Incremental Maintenance of Materialized Object-Oriented Views in MultiView: Strategies and Performance Evaluation, IEEE Transactions on Knowledge and Data Engineering, vol. 10, Issue 5, Sep.-Oct. 1998, pp. 768-792.

U.S. Appl. No. 10/006,605, filed Dec. 5, 2001, Office Action Mailing Date May 17, 2005.

Harumi A. Kuno and Elke A. Rundensteiner (1996), Using Object-Oriented Principles to Optimize Update Propagation to Materialized Views, pp. 310-317.

Gopalkrishnand, Vivikanand, et al., "Issues of Object-Relational View Design in Data Warehousing Environment", IEEE 1998, pp. 2732-2737.

Kung, Chenho, "Object Subclass Hierarchy in SQL: A Simple Approach", Communications of the ACM, Jul. 1990, vol. 33, No. 7, pp. 117-125.

Bello, Randall G., et al., "Materialized Views in Oracle", VLDB 1998, Proceedings of 24th International Conference on Very Large Databases, Aug. 24-27, 1998, pp. 659-664.

Najjar, Faiza, et al., "Cardinality estimation of distributed join queries", Database and Expert Systems Applications, Proceedings of the Tenth International Workshop, dated Sep. 1-3, 1999, pp. 66-70.

Moro, Gianluca, et al., "Incremental maintenance of multi-source views", Database Conference, 2001, ADC 2001, Proceedings, 12th Australasian, Jan. 2001, pp. 13-20.

West, Douglas B., et al., "Introduction to Graph Theory Second Edition", Prentice Hall, 2001, 6 pages.

"Oracle 9i Materialized Views" An Oracle White Paper (May 2001) 23 pages.

Mistry et al, "Materialized View Selection and Maintenance Using Multi-Query Optimization," IIT-Bombay Bell Labs Univ. of Massachusetts-Amherst (Jun. 2001).

Lane, Paul, et al., "Oracle9i Data Warehousing Guide (title pages)", Release 2 (9.2), Part No. A96520-01, retrieved from internet : http://download.oracle.com/docs/cd/B10501_01/server.920/a96520/title.html, Mar. 2002, 2 pages.

Lane, Paul, et al., "Oracle9i Data Warehousing Guide—Chapter 8, Materialized Views", Release 2 (9.2), Part No. A96520-01, retrieved from internet : http://download.oracle.com/docs/cd/B10501_01/server.920/a96520/mv.html, Mar. 2002, 41 pages.

http://www.research.att.com/conf/vldb98/program.html, Mar. 2001.

http://www.research.att.com/conf/vldb98, Mar. 2001.

D. Tanjar et al., "Aggregate-join query processing in parallel database systems"; May 14-17, 2000; High Performance Computing in the Asia-Pacific Region, 2000, Proceedings, The Fourth International Conference/Exhibition on, vol. 2, pp. 824-829.

Guido Proietti et al., "Analysis of range queries and self-spatial join queries on real region datasets stored using an R-tree"; Sep.-Oct. 2000; Knowledge and Data Engineering, IEEE Transaction, vol. 12, Issue 5, pp. 751-762.

Surajit Chaudhuri et al., "Optimizing Queries with Materialized Views", Proceedings of the Eleventh International Conference on Data Engineering, Mar. 6-10, 1995, pp. 190-200.

Vivekanand Gopalkrishnan et al., "Issues of Object-Relational View in Data Warehousing Environment", 1998 IEEE International Conference on Systems, Man, and Cybernetics, Oct. 11-14, 1998, vol. 3, pp. 2732-2737.

Harumi Kuno et al., "Augmented Inherited Multi-Index Structure for Maintenance of Materialized Path Query Views", Proceedings of the Sixth International Conference on Research Issues in Data Engineering, Feb. 26-27, 1996, pp. 128-137.

Arie Segev et al., "Maintaining Materialized Views in Distributed Databases", Proceedings of the Fifth International Conference on Data Engineering, Feb. 6-10, 1989, pp. 262-270.

Gautam Bhargava et al., "Hypergraph based reorderings of outer join queries with complex predicates", Proceedings of the 1995 ACM Sigmond International Conference on Management of Data and Symposium on Principles of Database Systems, May 22-25, 1995, pp. 304-315.

Gautam Bhagrava et al., "Efficient processing of outer joins and aggregate junctions", Proceedings of the Twelfth International Conference Data Engineering, Feb. 26, 1996-Mar. 1, 1996, pp. 441-449.

Maggie Biggs, "Oracle8 still in pole position", InfoWorld, Framingham; Dec 15, 1997, vol. 19, Issue 50, p. 1, 97, ISSN: 01996649.

Arbee L.P. Chen, "Outerjoin Optimization in Multidatabase Systems", Proceedings of the Second International Symposium on Databases in Parallel and Distributed Systems, 1990, Jul. 2-4, 1990, pp. 211-218.

HweeHwa Pang et al., "Partially Preemptble Hash Joins", Proceedings of the 1993 ACM Sigmond international conference on Management of data, 1993, pp. 59-68.

Kenneth Ross et al., "Materialized view maintenance and integrity constraint checking: trading space for time", Proceedings of the 1996 ACM Sigmond international conference on Management of data, Jun. 3-6, 1996, pp. 447-458.

Patrick O'Neil et al., "Multi-Table Joins Through Bitmapped Join Indices", Sigmond Record, vol. 24, No. 3, Sep. 1995, pp. 8-11.

Weipeng Yan et al., "Performing Group-By before Join", Proceedings of the 10$^{th}$ International Conference on Data Engineering, 1994, Feb. 14-18, 1994, pp. 89-100.

Byung Suk Lee et al., "Outer joins and filters for instantiating objects from relational databases through views", IEEE Transactions on Knowledge and Data Engineering, Feb. 1994, vol. 6, Issue 1, pp. 108-119.

Ming-Ling Lo et al., "Spatial Hash-Joins", Proceedings of the 1996 ACM Sigmond International Conference on Management of Data, 1996, pp. 247-258.

Robert Marek et al., "TID Hash Joins", Proceedings of the third international conference in Information and knowledge management, 1994, No. 2-, Dec. 2, 1994, pp. 42-49.

Priti Mishra et al., "Join Processing in Relational Databases", ACM Computing Surveys, vol. 24, No. 1, Mar. 1992, pp. 63-113.

Jixue Liu et al., "Derivation of incremental for nested relations", Database Conference, 2001, ADC 2001, Proceedings, 12th Australasian, Jan. 2001, pp. 76-82.

Gianluca Moro et al., "Incremental maintenance of multi-source views", Database Conference, 2001, ADC 2001, Proceedings, 12th Australasian, Jan. 2001, pp. 13-20.

Tok Wang Ling et al., "A model for evaluating materialized view maintenance algorithms", Web Information Systems Engineering, 2000, Proceedings of the First International Conference on, vol. 1, Jun. 2000, pp. 374-382.

Sushil Jajoda et al., "Polyinstantiation integrity in multilevel relations"; May 7-9, 1990; Research in Security and Privacy, 1990, Proceedings, 1990 IEEE Computer Society Symposium on, pp. 104-115.

Conrad Strocker et al., "Integrating semi-join-reducers into state-of-the-art query processors"; Apr. 2-6, 2001; Data Engineering 2001, Proceedings 17th International Conference on, pp. 575-584.

Klaus-Dieter Schewe, "On the unification of query algebras and their extension to Rational Tree Structures"; Jan. 29-Feb. 2, 2001; Database Conference, 2001, ADC 2001, Proceedings, 12th Australasian, pp. 52-59.

Jun Rao et al., "Using EELs, a practical approach to outerjoin and antijoin reordering"; Apr. 2-6, 2001; Data Engineering, 2001, Proceedings, 17th International Conference on, 585-594.

Maryela Weilbrauch, "DB2 for OS/390 V5 vs. V6 outer join performance3"; Apr. 24-25, Apr. 2000; Performance Analysis of Systems and Software, 2000, IEEE International Symposium on, pp. 46-51.

Peter Scheurmann et al., "Query processing in multidatabase systems"; Oct. 18-21, 1992; Systems, Man and Cybernetifcs, 1992 IEEE International Conference on, vol. 2, pp. 1250-1254.

* cited by examiner

FIG. 3
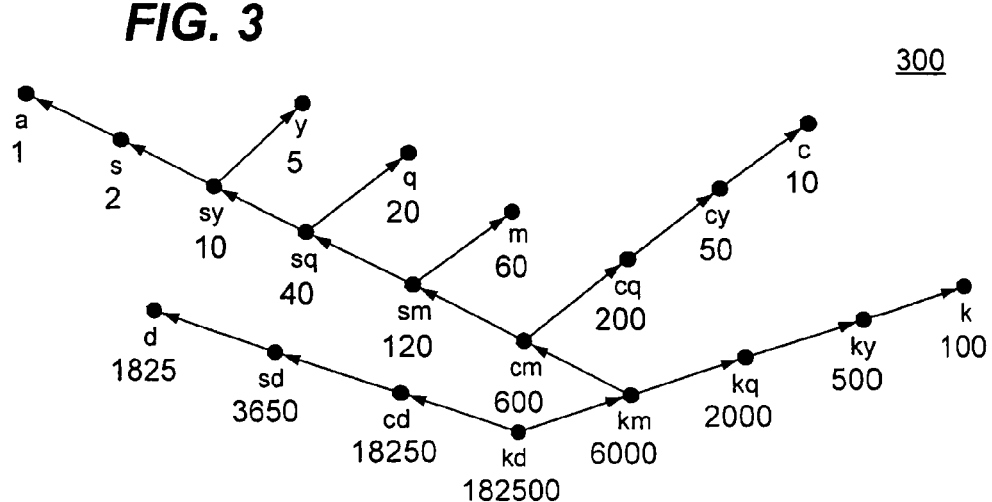
FIG. 4
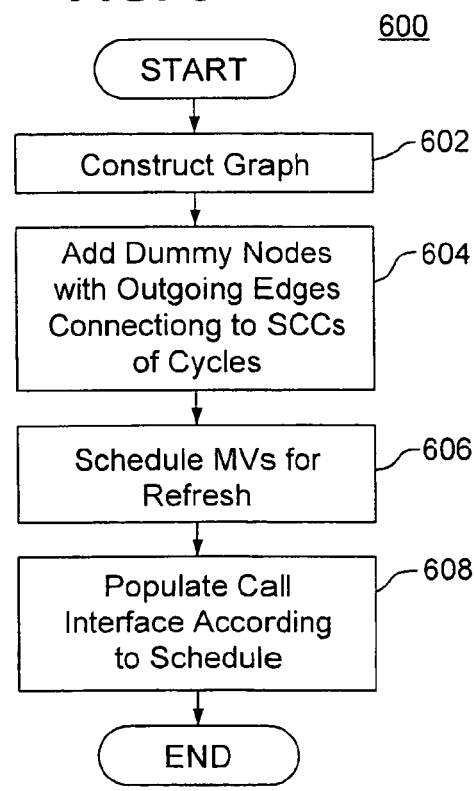
FIG. 5
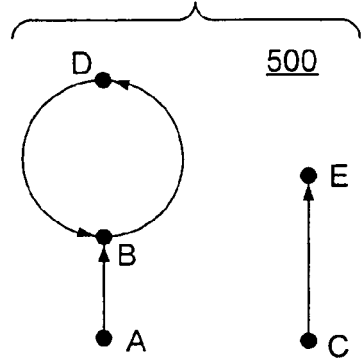
FIG. 6

700

750

800

900

1000

1100

CHOOSING WHETHER TO USE A DELAYED INDEX MAINTENANCE DEPENDING ON THE PORTION OF THE MATERIALIZED VIEW (MV) CHANGED

RELATED APPLICATIONS

This application claims priority benefit from U.S. Provisional Application No. 60/562,401 filed Apr. 14, 2004, entitled, "USING OPTIMIZER COST TO REFRESH A SET OF MATERIALIZED VIEWS", the entire contents of which are hereby incorporated by reference as if fully set forth herein under 35 U.S.C. §119(e).

This application is related to U.S. patent application Ser. No. 11/084,416, entitled, "USING ESTIMATED COSTS TO SCHEDULE AN ORDER FOR REFRESHING A SET OF MATERIALIZED VIEWS (MVS)", filed on Mar. 18, 2005, the entire contents of which are hereby incorporated by reference.

This application is related to U.S. patent application Ser. No. 11/084,174, entitled, "ALLOCATING CPU RESOURCES FOR A PARTICULAR REFRESH SCHEDULE", filed on Mar. 18, 2005, the entire contents of which are hereby incorporated by reference.

This application is related to U.S. patent application Ser. No. 11/084,331, entitled, "USING ESTIMATED COST TO SCHEDULE AN ORDER FOR REFRESHING A SET OF MATERIALIZED VIEWS", filed on Mar. 18, 2005, the entire contents of which are hereby incorporated by reference.

This application is related to U.S. Provisional Patent Application No. 60/572,138, entitled, "JOIN DEPENDENCY BASED REFRESH", filed on May 17, 2004 by Nathan Folkert, et al., the entire contents of which are hereby incorporated by reference.

FIELD OF THE INVENTION

The invention relates to Materialized Views (MVs) in general. More specifically, the invention relates to refreshing MVs.

BACKGROUND

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section. Similarly, the problems identified with an approach should not be assumed to have been recognized in the prior art, unless otherwise indicated.

In a Database Management System (DBMS), data is stored in one or more data containers, each container contains records, and the data within each record is organized into one or more fields. In relational database systems, the data containers are referred to as tables, the records are referred to as rows, and the fields are referred to as columns. In object oriented databases, the data containers are referred to as object classes, the records are referred to as objects, and the fields are referred to as attributes. Other database architectures may use other terminology.

The present invention is not limited to any particular type of data container or database architecture. However, for the purpose of explanation, the examples and the terminology used herein shall be that typically associated with relational databases. Thus, the terms "table", "row" and "column" shall be used herein to refer respectively to the data container, record, and field.

A group of changes to a database managed by a DBMS that must be made together are often referred to as a "transaction". A group of changes that must be made together are referred to as being performed "atomically". In performing a transaction, in many database systems, the changes made to the database prior to all the changes of the transaction have been performed are stored in a log, so that if it is determined that the transaction cannot be completed, the changes of the transaction that have been performed may be undone. A transaction in which all of its changes have been successfully completed may be said to have "committed". The log used for storing the changes associated with the transaction before the transaction has committed, is often referred to as the "undo log".

Views and Materialized Views

When a database management system contains very large amounts of data, certain queries against the database can take an unacceptably long time to execute. A view is a predefined query that is treated as a table. A view is a virtual table, and a view may be referenced by a database statement as if the view were an actual table. The tables in which the data is actually stored are base tables. The base tables are referenced directly or indirectly by a predefined query. To generate the rows of a view data is extracted and derived from the base tables.

A Materialized View (MV) is a view for which the results of the predefined query are stored as precomputed values. By materializing MVs, in this way, queries that take a long time to compute do not have to be executed multiple times, and consequently the data can be accessed faster and more efficiently.

In a database, operations on the base tables from which the MV was created do not directly affect the MV. Thus, after performing one or more database operations an MV may need to be refreshed to reflect the changes made to the database. To refresh an MV a refresh expression may be executed. A refresh expression is one or more database statements, executed to refresh an MV, that may either remove rows of an MV that need to be updated, and/or recompute and insert rows. The updated data may be taken from other tables. A "rewrite" is refreshing a portion of a first MV (e.g., using a refresh expression) by using a portion of a second MV. The second MV is one of the tables used in the refresh expression of the first MV. During the rewrite, portions of base tables may or may not be used in addition to the portions of the second MV for refreshing the first MV. Typically, whenever the base tables of an MV are updated, the MV is marked as stale until the MV is refreshed. The staleness of an MV affects how the MV is used by the database system. For example, through a process known as query rewrite, a query can be optimized to recognize and use existing MVs that could answer the query. The query rewrite engine will not use a stale MV unless there exists a setting for tolerating stale MVs, and the setting is also set so that stale MVs are tolerated.

Each MV may have its own refresh method. The Data Definition Language (DDL) statement that defines the MV may determine which of the refresh methods to apply. An MV can be refreshed to reflect the latest data changes ON DEMAND or ON COMMIT. When refreshing ON DEMAND, the user controls the refresh of MVs by choosing when to perform each refresh. Often, a choice of procedures for refreshing ON DEMAND are provided. For example, the user may be able to choose a procedure that selects one or more MVs to refresh, a procedure that refreshes those MVs that depend on a particular specified table, or a procedure that refreshes all MVs. If the user chooses to refresh ON COMMIT, the MV will automatically be refreshed on the commit of any transaction that updates the base tables referenced by the MV.

Scheduling Refresh Operations

Typically, when refreshing MVs, all of the MVs that need to be refreshed are submitted for refresh at essentially the same time, without performing a dependency analysis or attempting to balance loads. Submitting an MV for refresh may be referred to as "firing" the MV. Consequently, there may be a first MV, M1, which can be refreshed more efficiently after the refresh of a second MV, M2, because the refresh expression of M1 may be rewritten against M2. However, since the MVs are scheduled for refresh in an arbitrary order, M2 may get scheduled before M1. Additionally, a number of large MVs may be scheduled at the same time, thereby, causing the memory required by the queries to spill to disk and slow the execution of the queries. In some cases, the slowing of the execution and/or the spilling over to disk may lead to failures.

Various Ways of Refreshing MVs

There are a variety of different ways for refreshing MVs, such as a complete refresh, a fast refresh, or a forced refresh. In a complete refresh, the entire MV is rebuilt from scratch. In a fast refresh, only the data changes are applied to refresh the MV. A fast refresh may be referred to as an incremental refresh. Similarly, the changes to the MV during the fast refresh may be said to be applied "incrementally", because, in a fast refresh, a subset of the rows of the MV are replaced rather than re-computing the entire MV. In a forced refresh, first a check is performed to see if a fast refresh is possible. If a fast refresh is possible, the fast refresh is performed. If a fast refresh is not possible, a complete refresh is performed.

There are several varieties of fast refresh, such as conventional fast refresh, Partitioned Change Tracking (PCT) fast refresh using TRUNCATE, and PCT fast refresh using DELETE. In a conventional fast refresh, MV logs are kept for each of the base tables. The MV logs are used to construct the changes on the MV that correspond to the changes made on the base tables. Undo logs may be used as the MV logs. However, the MV logs are stored in a manner that facilitates queries. The MV logs track changes made to the base table that are relevant to the MV. To find which rows to apply the computed changes, the changes that need to be applied to the MV are joined to the original MV. If the number of rows being changed is relatively few, the cost of performing the conventional refresh may be relatively low, because only the rows changed are operated upon. However, if there are many rows that are being changed, the operation may have a high cost.

In any of the PCT fast refresh methods, at least one of the base tables has been partitioned, and the database tracks the changes to the partition base table at the partition level. In a PCT fast refresh, the rows to process are restricted using simple predicates on only the relevant partitions, reducing the computational cost of refreshing the MV. In order to perform either type of PCT fast refresh, at least one of the base tables for the MV must be partitioned.

The PCT fast refresh using TRUNCATE erases an entire partition within the MV, and recalculates or rewrites each row of the partition that was erased. No log is kept of the records in the partition that are erased during the truncation. The truncation operation is typically irreversible. In order to perform a PCT fast refresh using TRUNCATE, the MV must be partitioned in a manner related to the partitions in the base tables. The truncation operation is not dependent on the number of rows erased, and is fast relative to a row-by-row delete operation. However, the recalculation of the all the rows deleted may have a high cost.

The PCT fast refresh using DELETE deletes selected rows of an entire partition within the MV, and recalculates or rewrites the rows deleted. The PCT fast refresh using DELETE uses a delete operation, which enters each deleted row in a log of the operations performed. The PCT fast refresh using DELETE does not require the MV to be partitioned.

Each of the fast refresh methods are possible only in certain scenarios. Specifically, a conventional fast refresh is possible if the only operations performed on the base tables were DML operations specified in database statements. For example, if Partition Maintenance Operations (PMOPs) (e.g., adding, dropping, splitting, and merging partitions), were performed on the base tables, a conventional fast refresh is not possible, because if any PMOPs were performed, the base table changes are not available in the MV logs. Thus, if a PMOP occurred, only a PCT fast refresh or complete refresh may be performed. PCT fast refresh can be used both in the presence of DMLs on base tables and PMOPs on partitioned base tables.

During a PCT fast refresh with TRUNCATE, the TRUNCATE causes the transaction to commit. Consequently, following a TRUNCATE, any refresh operation that needs to be done will be in a separate transaction. Hence, PCT refresh with TRUNCATE cannot be done in one transaction and is therefore not atomic. Consequently, a PCT refresh is not possible for an "atomic" refresh.

In one manner of implementing a fast refresh, if an MV needs to be refreshed, the decision of whether to choose a conventional fast refresh, PCT fast refresh using TRUNCATE, PCT fast refresh using DELETE, or a complete rebuilding of the MVs is based on heuristic rules. The refresh options are prioritized in the following order: (1) conventional fast refresh (2) PCT fast refresh with TRUNCATE (3) PCT fast refresh with DELETE, and (4) a complete rebuild. The heuristic rule checks to see if the refresh method with the highest priority could be performed. If the refresh method with the highest priority could not be performed, the refresh method with the next highest priority is checked to see if it could be performed. In other words, each refresh method is checked to see if it could be performed in the order of priority until the refresh method with the highest priority that could be performed is found.

For example, using this prioritization of refresh techniques for the heuristic rule, first a check is performed to see if a conventional fast refresh is possible. If a conventional fast refresh is possible, it is performed. If, for example, a PMOP was performed, the conventional fast refresh cannot be used, a check is made to see if PCT fast refresh with TRUNCATE can be performed. If the PCT fast refresh with TRUNCATE can be performed, it is. However, if, for example, the MV is not appropriately partitioned, PCT fast refresh with TRUNCATE cannot be used, and therefore, a check is performed to see whether a PCT fast refresh with DELETE can be used. If the PCT fast refresh with DELETE can be performed, it is. If, for example, the base tables are not partitioned or for some other reason the PCT fast refresh with DELETE also could not be performed, then the MVs would be recreated from scratch.

Unfortunately, however, the heuristic rule does not necessarily result in the most optimal refresh technique.

In view of the above it is desirable to lower the cost of refreshing MVs.

BRIEF DESCRIPTION OF THE DRAWINGS

The present invention is illustrated by way of example, and not by way of limitation, in the figures of the accompanying drawings and in which like reference numerals refer to similar elements and in which:

FIG. 3 is an example of a graph of a schedule for refreshing a federated cube.

FIG. 4 is a diagram related to a refresh schedule for tables of an example schema.

FIG. 5 represents the resulting refresh graph for the example schema of FIG. 4.

FIG. 6 is block diagram of a flowchart for an example of a method for building a refresh graph.

DETAILED DESCRIPTION OF THE INVENTION

Figure 1:
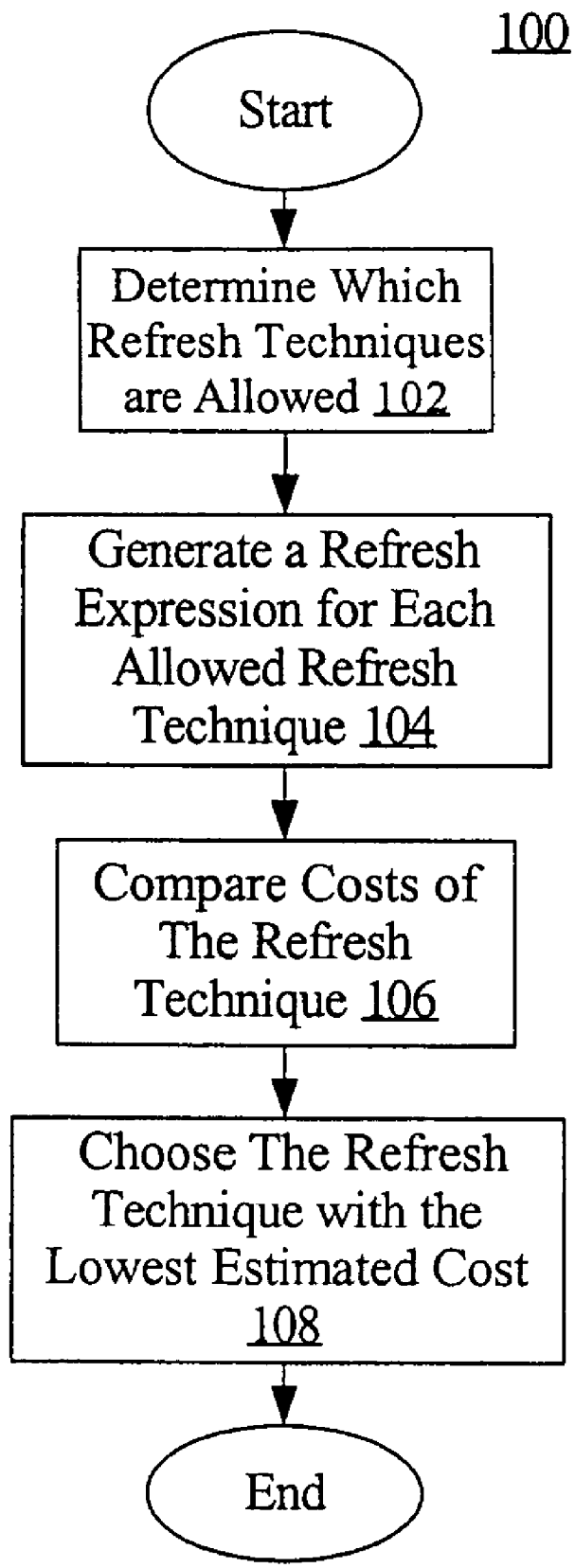
FIG. 1 is a block diagram of a flowchart of an embodiment of a method of performing a cost based refresh of an MV.

A method and apparatus for reducing costs associated with refreshing a set of one or more materialized views is described. In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

Several features are described hereafter that can each be used independently of one another or with any combination of the other features. However, any individual feature may not address any of the problems discussed above or may only address one of the problems discussed above. Some of the problems discussed above may not be fully addressed by any of the features described herein. Although headings are provided, information related to a particular heading, but not found in the section having that heading, may also be found elsewhere in the specification.

Functional Overview

In an embodiment, estimated costs are used to pick the best refresh technique (e.g., method) for a given MV. In another embodiment, estimated costs are used to schedule the refresh of a set MVs in an order such that overall time to refresh is reduced, or in an order that uses the smallest overall time, for refreshing when compared to other alternative refresh schedules. In another embodiment, the estimated cost of refreshing each of a set of MVs is used to select the set of CPU resources to allocate to refreshing each MV. The allocation of CPU resources is chosen based on the estimated costs. The allocation of CPU resources is chosen to be more optimal (e.g., use less CPU time) than other allocations of CPU resources. In an embodiment, when refreshing an MV a delayed index maintenance is chosen if a significant portion of the base table and/or the partitions of the table has changed. Each of the features of the above embodiments may be used together in one embodiment or any combination of the features of the above embodiments may be used together.

Cost Estimation

The cost of an operation may be the amount of CPU time required to perform the operation. However, any of a variety of other measures of cost may also be used. The estimation of the CPU time or other cost may be performed in a manner that takes into account the current system's available resources and constraints.

Cost Based Decision to Choose Optimal Refresh

In an embodiment, the decision to choose a particular fast refresh method is cost-based. An optimizer generates an execution plan of a refresh expression. Each refresh method is decomposed into multiple steps that have corresponding refresh expressions. Each refresh expression is a DML statement. In an embodiment, the refresh operation gives the optimizer the DML statements into which the refresh method is decomposed. The optimizer then computes a cost associated with each refresh technique. In other words, the refresh system interacts with an optimizer to get estimated costs of performing a conventional fast refresh, a PCT fast refresh with TRUNCATE, and a PCT fast refresh with DELETE and then, picks the best one. It may seem that a PCT fast refresh with TRUNCATE is always better than a PCT fast refresh with DELETE, because it is faster to erase an entire partition (without worrying about logging the resulting changes) than to perform a delete operation on each row, one row at a time, on a portion of the partition. Consequently, it could be expected that PCT refresh with TRUNCATE should always be better than PCT refresh with DELETE. However, if the MV is partitioned and MV partitions are not fully contained in the base table partitions, a TRUNCATE operation on an MV partition may remove significantly more data than the corresponding DELETE operation, because the TRUNCATE operation removes all the rows in the entire partition, and the DELETE operation only removes selected rows in the partition. Consequently, after the TRUNCATE operation, the refresh process may have to compute and load more data (as a part of an INSERT DML) than after the DELETE. However, the TRUNCATE operation is much faster than the DELETE operation, thus in situations when both the PCT refresh with DELETE and the PCT refresh with TRUNCATE are possible, either may be more optimal depending on the specifics of the portions of the MV that need to be refreshed. Consequently, the optimizer is used to compute which refresh method is more optimal.

FIG. 1 is a block diagram of a flowchart of an embodiment of a method 100 of performing a cost based refresh of an MV. In step 102, a determination is made as to which refresh methods are allowed. The refresh method that is allowed may depend in part on the request in that the user may be given the option of requesting or excluding certain types of refresh techniques. Additionally, certain refresh techniques may not be possible for certain MVs. In step 104, if more than one type or refresh technique is allowable, refresh expressions are generated for each allowed refresh technique. In step 106, an estimate is made of the cost of each technique based on the refresh expression. In step 108, the estimated costs of the refresh techniques are compared, and the refresh technique with the lowest cost is selected and executed.

For example, in an embodiment, if a user requests a FAST refresh, refresh expressions are generated for a conventional fast refresh, a PCT fast refresh using TRUNCATE, and a PCT fast refresh using DELETE. Then, an optimizer uses the refresh expressions to estimate the costs of each refresh technique. Based on the estimated costs, a refresh method is chosen. In an embodiment, the refresh method chosen is the refresh method with the lowest estimated cost.

Similarly, if a "FORCE" refresh is chosen, in some cases, the percentage change of data to base tables may be large enough that rebuilding the entire MV is faster than any of the fast refresh methods. Consequently, in an embodiment, when doing a "FORCE" refresh, the optimizer estimates the cost of the complete refresh in addition to estimating the cost of each fast refresh, and the technique with the lowest cost is chosen.

Partition Aware Index Maintenance

An index maintenance may be performed as part of the fast refresh. In an embodiment, while doing a PCT fast refresh and issuing a TRUNCATE on the MV, all of the local MV indices may be disabled for affected partitions by, for example, marking the indices as unusable prior to the refresh. The indices marked as unusable are, later, completely rebuilt on the partitions that are being recompiled. In addition, if a refresh of an MV involves Direct Load (DL) inserts into empty partitions, as above, all of the local MV indices are disabled, by for example marking the indices as unusable, prior to the refresh. A DL INSERT formats and writes data directly into data files by appending the inserted data after existing data in a table, without using the buffer cache and free space within the existing data. A DL INSERT is performed without logging redo and undo entries. For example, a refresh of an MV that involves DL inserts into empty partitions may occur when the MV and base table have identical partitioning schemes, and the refresh operation corresponds to adding a partition to the base table followed by an INSERT. Then the disabled indices are later completely rebuilt on the partitions that have been inserted into the base table. In this manner the index maintenance may be delayed. For example, in cases where it can be determined that the MV partitions are being recreated from scratch, the index maintenance can be delayed.

Figure 2:
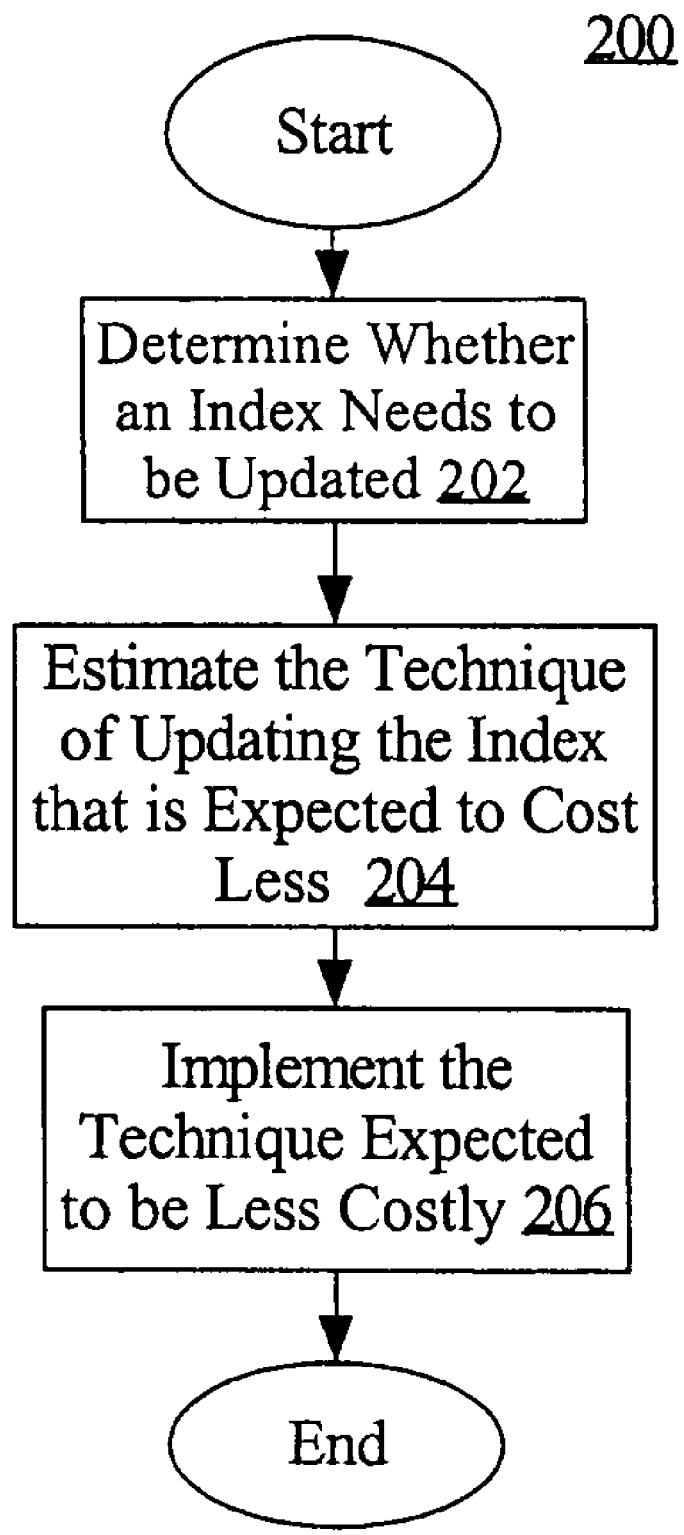
FIG. 2 is a block diagram of a flowchart of an embodiment of a method 200 of performing a cost based refresh of an index of an MV.

A complete rebuild of indices may be issued once data has been inserted into the affected partitions. A delayed index maintenance can be performed if the rows on the table were committed. Consequently, a delayed index maintenance is a two step process. The first step is a transaction that commits changes to the table. The second step is another transaction that does the index maintenance. Thus, the delayed index maintenance is non-atomic, and therefore the delayed index maintenance can only be performed for a non-atomic fast refresh. In one manner of maintaining indices, the delayed index maintenance is generally only done if the partitions are being recreated from scratch, because for other scenarios the delayed index maintenance was assumed to be slower. However, if the partitions are not being recreated from scratch, it may often still be quicker to perform the delayed index maintenance rather than an incremental index maintenance (an incremental index maintenance updates the index in increments as changes are made to the tables that the index is associated with). Specifically, if the changes to the base table and/or table partition ate above a certain percentage, delayed index maintenance may be better than incremental index maintenance FIG. 2 is a block diagram of a flowchart of an embodiment of a method 200 of performing a cost based refresh of an index of an MV. In step 202, a determination is made as to whether an index associated with an MV needs to be refreshed.

In step 204, if both an incremental refresh and a delayed index maintenance refresh are possible, an estimation is made as to which is technique will cost less. In other words, in an embodiment, an estimation is performed as to whether it is likely to cost less to incrementally maintain an index or to perform a delayed index maintenance. For example, in an embodiment, if the indices of an MV have at least some partitions that are affected by the refresh, a decision is made whether to perform a delayed index maintenance, which may be based on an estimate as to whether it is expected that the cost will be higher for performing a delayed index maintenance or the incremental index maintenance. In an embodiment, an estimate of which technique is expected to cost more is made based on the percentage of the base table and/or partitions of the base table that has changed. In other words, the percentage of the base table that has changed may be used as an indicator as to which method will be less costly.

In step 206, the technique of maintaining the index that is expected to be less costly is chosen and performed. For example, if the percentage of change to the base tables and/or partitions is greater than a specific threshold, then a delayed index maintenance is performed. If the percentage is less than the specific threshold, then the index is maintained incrementally. In an embodiment, the indices are disabled prior to issuing the refresh DMLs. The disabled indices may then be rebuilt after refresh DML statements have run. Any threshold or range of thresholds may be chosen. In an embodiment, the threshold is set to 10%. Thus, if the percentage of the MV that is being recalculated is greater than 10%, then a delayed index maintenance is performed. If the percentage is less than 10%, then the index is maintained incrementally. The exact percentage that is most beneficial for setting the threshold depends on the specifics of the MV, the tables from which the MV is derived, and the nature of the changes performed, for example. Frequently it has been found to be beneficial to perform a delayed index maintenance if 6% or more of the MV was changed. In alternative embodiments, thresholds other than 10% may be used. For example, in an embodiment, thresholds close to 10% may be used. In examples of other alternative embodiments thresholds are chosen from the range of 6% or higher, 10% or higher, 15% or higher, 6% to 15%, 6% to 10%, and 10% to 15%, respectively, may be used.

Scheduling the Order of Refresh for Multiple MVs

If multiple MVs are being refreshed, it may be possible to lower the cost of refreshing the MVs by refreshing one or more MVs and using these MVs for part of the refresh of one or more other MVs. The ordering of the refresh of the MVs determines which MVs may be refreshed using other MVs, because the refresh of a given MV can be performed by a rewrite from all of the MVs that are fresh at the time that the given MV is being refreshed. Consequently, the MVs are scheduled to be refreshed in an order such that MVs used by other MVs for refreshing are scheduled first, and such that the cost of refreshing the entire collections of MVs is minimized or at least lower than were the MVs refreshed in one or more other possible orders for refreshing the MVs. The costs of refreshing an MV using each of a plurality of sets of other MVs and base tables as a basis for rewrite (a rewrite basis) are compared. A rewrite basis node is a node from which a portion of the MV may be rewritten by copying or otherwise using a portion of the rewrite basis node. The set of one or more MVs, the set of one or more base tables, or the set of a combination of MVs and base tables that results in the lowest cost is used as the rewrite basis for refreshing the MV.

In an embodiment, the schedule of the order in which to refresh the MVs is determined by recursively scheduling one MV at a time starting from those MVs that are refreshed directly from the base tables. In an embodiment, refresh expressions are generated for the MVs that need to be refreshed. Based on the estimated costs associated with each refresh expression the cheapest set of refresh expressions that are useable together are chosen. The set of refresh expressions chosen determines the order in which the MVs are scheduled to be refreshed.

Refresh Graph

FIG. 3 is an example of a graph 300 of a schedule for refreshing a federated cube. The graph of FIG. 3 is an example of a refresh graph.

An embodiment of an MV refresh scheduling algorithm is based upon finding the best refresh graph. Let a list of MVs to be refreshed be referred to as the "Refresh List". Then the best refresh graph is a graph G={V, E}, where V is a set of nodes, in which each node represents an MV in the Refresh List, and E is the set of edges. An edge that represents inclusion of the materialized view V1 in the execution plan of the refresh expression of the materialized view V2 may be denoted using the notation V1->V2. A refresh graph represents a schedule for refreshing MVs, which may be referred to as a refresh schedule.

Regarding FIG. 3, assume that there exists a set of tables including information about sales for a particular company, and included within the set of tables is information pertaining to the cash received as a result of the sale, the name of the customer, the day, month, quarter, year, city, and state of the customer. In other words, FIG. 3 is an example of a federated cube having dimensions for time (year, quarter, month, day) and location (state, city, customer). A federated cube stores the result of each GROUP BY clause without hierarchical lineage in a separate MV. A hierarchical lineage (which will be referred to as a "lineage") is the set of all columns participating in the hierarchy levels. For example, for the tuple (year, quarter, month), the lineage for the month level is (year, quarter, month), the lineage for the quarter level is (year, quarter), the lineage for the year level is (year).

A federated cube includes a set of MVs in which each MV represents a different aggregation level. For example, a table may include sales data, and may have columns for store, city, state, day, month, and year. One MV, A, may be an aggregation of the daily sales of all stores within each city. MV A would have columns for city, and day, but not for the individual store. A second MV, B, of the federated cube may have an aggregation of the daily sales of all cities within each state, and therefore would have columns for state and day. A third MV, C, may have all the sales of all the days aggregated over a month for all stores in a city, and therefore would have columns for city and month. MV A, B and C form a federated cube in which MV A is at a first level of aggregation and MVs B and C are each at a second level of aggregation. In other words, an MV at the lowest level or source level may be an aggregation of a measure of a fact table over the lowest levels of each dimension. The source level is the level of the source nodes. A source node is a node with no unscheduled incoming edges. In the federated cube of MVs A, B, and C, before any of the MVs are scheduled, MV A is a source node, because it is refreshed directly from the base table. A source node of a graph represents a node that is available for scheduling because it either does not rewrite against any of the other nodes being refreshed, or all the nodes in the graph it rewrites against have already been scheduled, and so will be refreshed before this node. An MV at the next level will aggregate an MV of the lowest level over another dimension. Each MV at any particular level is an aggregation of an MV of the next lower level over some dimension.

Each grouping combination has its own container, which is an MV. In FIG. 3, each dot (which may be referred to as a node of the graph) represents an MV. Each MV is labeled with one or more letters and numbers. The numbers next to the MVs represent the cardinality (the number of row entries) of that MV, and the letters represent dimensions over which the sales were aggregated. Specifically, in FIG. 3, k represents customer, s represents state, c represents city, d represents day, m represents month, q represents quarter, y, represents year, and a represents all.

Thus for example, for each customer and each day, the MV labeled kd may have an entry representing the total cash received from that customer on that day. Similarly, the MV cd has one entry for each day and each city, which is the total of all sales transacted on that day at that city. The MV "a" has only one entry, which is the total of all the sales the company ever made no matter which location or customer performed the transaction.

Assume that each customer performs transactions at only one location, but there may be a plurality of customers associated with each location. Then, the MV cd may be obtained, for each city, by summing the sales of each customer associated with a particular city. Thus a sum of the rows of MV kd may be used to create MV cd.

In a federated cube, each level of the cube is stored without lineage in a separate container table. In other words, the MVs are stored without any ordering with respect to one another. Choosing the right order will enable the refresh of higher level MVs by using rewrites (with join backs and rollups) to optimally reduce the cost of refreshing the MVs. In an embodiment, the joins and group-by columns in the queries defining a set of MVs are analyzed while taking into account hard edges. Hard edges are determined based on the structure of MV rather than on the refresh cost. Hard edges are required for a proper refresh of one or more of the MVs that are associated with the hard edge. Internal edges that exist due to a nested MV are hard edges, because these edges are required to obtain a correct set of MVs. Based on the analysis an optimal order of refreshing the MVs is derived.

In an embodiment, for each of a set of refresh schedules, the MV rewrite system is used for estimating the cost of using rewrites against other MVs. The cost of refreshing a particular MV is computed using one or more MVs selected from a set of MVs that are usable for refreshing that particular MV. The computation costs of refreshing a particular MV is repeated for each of the MVs in the set of MVs. Then a refresh schedule that has the lowest cost is chosen from the set of refresh schedules. When computing the cost of refreshing a first MV using a second MV, each available technique of refresh is investigated, and the cost of the cheapest available refresh technique is used as the cost of refreshing the first MV using the second MV.

For example, a determination may be made that MV kd can only be refreshed against the base tables (while the other MVs may be refreshed against other tables or against the base table). Consequently, a decision is made to refresh MV kd directly from the base tables. A determination may also be made that MVs cd and km may be either refreshed against the base tables or against MV kd. Since km and cd cannot use the information from any of the other MVs for performing a refresh, performing a refresh of MVs km and cd using other MVs does not need to be considered. Accordingly, an estimate is made as to whether it is more cost effective to refresh the MVs cd and km against the base tables, MV kd or to refresh part of MVs cd and/or km against the base table and part against the MV kd. Assume that it is determined that it is more efficient to refresh MVs cd and km from MV kd than from the base tables. Then MVs cd and km are accordingly scheduled as indicated in FIG. 3. Accordingly, it may have been determined to refresh the MVs of FIG. 3 according to a schedule that follows the graph of FIG. 3. For example, in FIG. 3, it may have been determined to refresh MV y from MV sy and to refresh MV sy from MV sq.

Using rewrite, an MV may be refreshed one level of aggregation at a time against an already-refreshed MV of a lower level of aggregation. The federated cube of FIG. 3 may store 5 years of sales, and from 100 customers that are located in 10 cities and 2 states, for example. The edges follow rollups from base materialized views, and it is assumed that in the example of FIG. 3 that the best refresh is always against the suitable MV with the smallest number of aggregations. In an embodiment, the cardinality may be used as one criterion for determining which MVs are likely to be most efficient for building other MVs. For example, MV sm has 120 rows, and MV cm has 600 rows. Consequently, MV sm is scheduled for refresh as a rollup of MV cm. In an embodiment, if the MVs are currently being built for the first time (i.e., their containers are empty), an estimate is made of the cardinality of any such Refresh List MV, based on the underlying query. The cardinality may be used as an estimate for the percentage of the MV that is being changed by the refresh operation using a particular schedule and the cost of the refresh of that schedule.

The set of MVs that are useable for refreshing a particular MV are a set of MVs that include at least a set of rows that are also included in or used in computing the particular MV. For example, a set of MVs may be the MVs that are at lower levels of aggregation and which may be used to compute the particular MV by performing an aggregation over a dimension. Thus, all of the MVs are available for refreshing MV a, for example. However, it is not necessarily equally efficient to refresh MV a against each of the other MVs. It may be inefficient to refresh MV a directly from MV kd, because much of the computations that are used to compute MV a also need to be performed in computing MV s or MV sy, for example.

In an embodiment, the cardinality of the MVs may be used estimating the cost of a refresh and therefore in determining which MV to use for refreshing other MVs, which may be of a higher level of aggregation. For each MV, by repeatedly comparing the cost of using the information in each of the MVs containing information that is useable in a refresh, a schedule such as that illustrated in FIG. 3 may be obtained. Typically, the best refresh graph of a federated cube is a tree (which has a single parent). Without rewrite, all of the MVs of FIG. 3 would be using the same base data instead of a significantly smaller MV, and without scheduling, the benefits of rewrite could be much less.

The best refresh expression of an MV is the optimal refresh expression for that MV, or the refresh expression with the east time in which a query would execute, as estimated by a cost optimizer. The best refresh expression is the refresh expression with the lowest estimated cost of any of the refresh methods, where any query may be rewritten against any base table, any fresh MV, or any MV in the Refresh List excluding itself. Each refresh expression may contain more than one SQL DML command. For example, a refresh expression may involve a DELETE expression followed by an INSERT expression, so that the cost of the refresh is the total cost of all database commands generated for the refresh.

In an embodiment, even though the MVs in the Refresh List are not necessarily fresh, when calculating the best schedule all MVs are considered fresh for the purpose of rewrites while building this graph, so that any ordering of the refresh operations can be considered. There is no problem in considering the stale MVs that are in the Refresh List as fresh, while estimating costs of different schedules, because once a schedule is decided upon the MVs may be refreshed in an order such that each MV is refreshed from a fresh MV.

In an embodiment, the best refresh graph has the property that the source nodes represent materialized views whose best refresh expression contains base tables and/or MVs that are already fresh. After refreshing the materialized views represented by source nodes, the refreshed source nodes can be removed from the graph. The new source nodes generated represent MVs whose best refresh is also against base tables and/or MVs that are fresh, which includes any MV in the Refresh List that has already been refreshed. Thus, the ordering of MVs can be decided by picking MVs from the Refresh List one level at a time. In the first application, those MVs that will be refreshed directly from the base tables, without relying on any other MVs are decided upon and refreshed. Next, those MVs that will be refreshed from a combination of the base tables and those MVs that were just refreshed are decided upon and refreshed. The process of deciding and refreshing MVs that will be refreshed based on the base tables and those MVs that were already refreshed is repeated until all of the MVs are refreshed.

Scheduling the Refresh of Multiple MVs While in Enforce and Trusted Modes

The constraints on objects (e.g., the properties of the object) in the database may be "enforced" or "trusted". Enforced constraints are verified and maintained by the server, and the database server ensures that the constraints are valid. An example of an enforced constraint is a primary key-foreign key constraint in validate mode. An MV is in enforced mode if the MV is defined as "REFRESH USING ENFORCED CONSTRAINTS". In enforced mode, the database server may only use enforced constraints for refreshing the MV.

Trusted constraints are considered valid if the user indicates that the constraints are valid. However, the database server does not verify that trusted constraints are indeed valid, but "trusts" the user instead. Trusted constraints may lead to wrong results if the trusted constraints are not really valid. An example of a trusted constraint is a primary-foreign key constraint in RELY mode. An MV is in trusted mode, if the MV is defined as "REFRESH USING TRUSTED CONSTRAINTS". In trusted mode, the database server may use both enforced and trusted constraints for refreshing the MV.

For the purposes of estimating the cost of different schedules, an MV will be considered in enforced mode if the MV is in the Refresh List and even if the MV is currently stale, but the MV definition will allow rewrites in enforced mode after being refreshed. Specifically, an MV will be considered fresh, available for rewrite, and in enforced mode if (1) the MV is currently fresh and allows query rewrites in enforced mode, or (2) the MV is in the Refresh List and is currently stale, but will allow rewrites in enforced mode after being refreshed.

Similarly, a materialized view will be considered fresh and available for rewrite in trusted mode but not in enforced mode, if (1) the MV is currently fresh and allows query rewrites in trusted mode, but does not allow query rewrites in enforced mode, or (2) the MV is in the Refresh List and is currently stale, but will allow query rewrites in trusted mode but may not allow rewrites in enforced mode after being refreshed.

Cycles

In a graph, a cycle is a set of edges that form a closed loop. In this specification, a cycle is a set of edges connecting a set of nodes such that each node is reachable from each of the other nodes. For example, A<->B (which could also be represented as A->B->A) is a cycle, because node A may be reached from node B and visa versa. Similarly, A<->B<->C<->A and A->B->C->D->A are other examples of cycle.

Each node in a cycle may be directly linked to all other nodes in the cycle. The cycles A<->B<->C<->A is an example of a cycle in which all nodes are directly linked to each other. However, the nodes of a cycle do not have to be directly linked to all other nodes to form a cycle. Each node of a cycle only needs to be reachable from all other nodes of the cycle. Thus, for a first node, A, to be reachable from a second node, C, the node A does not have to be directly linked to node C. As long as one can construct a path of edges that connect node A to node C in which the edges lead in the direction that starts from node C and ends at node A, node A is reachable from node C. For example, in a cycle in which node A is reachable from node C, node A may be indirectly linked to node C by having an outgoing edge from node A that connects to a third node, B, and node B may have an outgoing edge that connects from node B to node C. For example, the set of nodes A->C->B->A form a cycle. Similarly, the set of nodes, A->B->C->D->A, is an example of a cycle, in which each node is reachable from any other node, even though the edges all point in one direction and the nodes are not directly linked to one another.

Each of the MVs that forms one of the nodes within a cycle may be used directly or indirectly as a basis for building each of the other MVs represented by the nodes of the cycle. The set of nodes within a cycle may be referred to as a Strongly Connected Component (SCC). An acyclic graph is a graph that does not have any cycles. For example, the refresh graph generated for a federated cube (e.g., FIG. 3) is acyclic. If a graph is acyclic, an optimal serial schedule may be obtained by scheduling the MVs in the refresh list one level at a time.

An Example of a Refresh Graph Having a Cycle

FIG. 4 is a diagram related to a refresh schedule for tables of schema 400. At the time of the refresh, the tables in a schema 400 may be divided into three groups: the base tables and fresh MVs 402, the Refresh List 404, and other stale materialized views 406, which are not being refreshed. Suppose Refresh List 404, includes MVs A, B, C, D, and E, base tables and fresh MVs 402 includes base tables and fresh MVs T, S, and V, and other stale MVs 106 includes stale MVs Y and Z. The arrows in FIG. 4 indicate the MVs and tables that may be used to refresh other MVs. The double-headed arrow connecting B and D indicates that either of MVs B and D may be used as a rewrite basis for refreshing the other of MVs B and D. The following refresh expressions may be calculated for MVs A-E, T, S and V.

A: INSERT INTO A SELECT * FROM T, S
B: INSERT INTO B SELECT * FROM A, D
C: INSERT INTO C SELECT * FROM S
D: INSERT INTO D SELECT * FROM B
E: INSERT INTO E SELECT * FROM C, V

FIG. 5 represents the resulting refresh graph 500 for schema 400 of FIG. 4. The refresh graph does not include base tables and fresh MVs 402, because they are either base tables or else are fresh, and therefore do to need to be refreshed. Since MVs Y and Z from the set of stale MVs 406 are not being refreshed the refresh graph also does not include MVs Y and Z. Additionally, since MVs Z and Y are stale and are not included in the refresh list, MVs Y and Z may not be used as the rewrite basis. The two arrows connecting MVs B and D form a cycle, and indicate that that either of the MVs B and D may be used as a rewrite basis for refreshing the other of MVs B and D.

Handling Cycles in Refresh Graphs

Cycles in the Refresh Graph may pose a problem for scheduling the refresh of MVs, because cycles complicate determining a serialized order for execution. Cycles may be identified and isolated by finding an SCC in the Refresh Graph and creating a dummy node with outgoing edges connecting to each of the nodes of the SCC. The node created is treated as though it may be used as a rewrite basis for each the nodes of the SCC, but the dummy node for the SCC is only a place holder. In an embodiment, sufficiently many nodes are created and the created nodes are located in a manner so as to ensure that the resulting cycles are as small as possible.

After creating the dummy SCC nodes, the cycle may be broken by removing internal edges of the cycle. Removing the internal edges reduces the number of dependencies to which the scheduling must be applied. Any of the internal edges may be chosen to be removed, one at a time, until the graph is acyclic. Thus, in an embodiment, a process that randomly selects the next edge to remove, or that selects the next edge to be removed on a deterministic basis that is unrelated to cost (e.g., an alphabetical or numeric order of the identifiers of the nodes) may be used to break a cycle. To break a cycle in a manner that results in the lowest cost refresh graph, the costs of the refresh expression for each subset of the materialized views in the corresponding cycle would need to be determined. Since the number of refresh expressions that would need to be calculated is large, it may be desirable to use a set of heuristic rules for determining which internal edges to remove. The heuristic rule will typically break a cycle in a manner that results in a lower cost refresh graph than a random selection or a selection that is not based on cost.

There are many potential heuristic rules for eliminating cycles. In one embodiment the heuristic chooses a node that, if scheduled, is expected to break the cycle fastest as compared to scheduling other nodes of the SCC. Each unscheduled node of the SCC is chosen in turn as a trial MV for scheduling. For each trial MV, each MV listed in the trial MVs outgoing list is tested to see if the listed MV will become a source node were the trial MV scheduled. Scheduling of an MV has the effect of removing all incoming edges that come from unscheduled MVs. While determining whether an MV in the trial MV's outgoing edge list will become a source, all edges that would be removed as a result of scheduling the trial MV are assumed to have been removed. Each trial MV is scored based on the number of new sources produced. The trial node that results in the highest score is scheduled. After scheduling these source nodes, if nodes remain in the SCC, the process including choosing a trial MV and of assigning a score to each node, and scheduling the MV is repeated. The cycle is broken when all nodes in the SCC are scheduled, and a new acyclic ordering for the nodes of the refresh graph is found. Scheduling a node in an SCC, may create or uncover new source nodes. The new source nodes created may be either outside of the SCC or inside the SCC. The new source nodes created inside the SCC may be nodes that only have incoming edges from the dummy SCC node. The source nodes created may be immediately scheduled for refreshing other nodes in the SCC. Consequently, in an embodiment, a check for new potential source nodes is performed before breaking a cycle. After finding the new acyclic ordering, the dummy SCC node is removed, which now has no outgoing edges.

In an embodiment, scheduling nodes within an SCC is delayed as long as possible, because the most common cycle will likely be duplicate or very similar MVs rewriting exclusively against one another. MVs that may be rewritten exclusively against one another may create redundant work if the refresh of one of the nodes in the SCC is performed earlier in the schedule than necessary, because another MV summarizing a useful part of the data relevant to a node in the SCC that may not have been scheduled yet. Scheduling the other MV first and using a portion of it for refreshing the node in the SCC may lower the cost of refreshing the node in the SCC.

Example of a Method of Building a Refresh Graph

FIG. 6 is a block diagram of a flowchart for a method 600 for building a refresh graph. The algorithm proceeds in stages. In step 602, a graph is constructed. During the graph construction, nodes are allocated for each of the materialized views being refreshed, and edges are created between the nodes. Edges are first added to established dependencies between nested materialized views or other hard edges, and then edges are added representing the refresh dependencies with the lowest cost.

In step 604, a search for SCCs in the resulting graph is performed, and the SCCs are detected if any SCCs exist. A dummy node is created whenever the size of the SCC is larger than a single node. The dummy node is located such that it may serve as a single entry point for the SCC: all incoming edges to any node in the SCC from outside that SCC are added to the incoming list of edges of the SCC dummy node, and each node in the SCC is added to the outgoing list of edges of the dummy node. Adding these nodes and edges may be used to ensure that all dependencies of the SCC are refreshed prior to scheduling the nodes in the SCC.

In step 606 the scheduling is performed. During the scheduling, source nodes are found and anchored in the schedule. When the only nodes that are encountered are part of an SCC, a first one of nodes in the SCC nodes is selected for scheduling. The selection is based on a heuristic rule, which determines which node in the SCC to schedule first by removing internal edges causing the cycle. In an embodiment, in scheduling nodes in an SCC, the best refresh expression is recomputed for the nodes in the SCC being scheduled against those nodes that are currently scheduled, and remove incoming edges of the nodes in the SCC that originate from other nodes in the SCC. Whenever a node is anchored in the schedule, all incoming edges from nodes that have not yet been added to the schedule are deleted from the graph. In an embodiment, incoming edges may originate from nodes that have not been scheduled only when scheduling nodes in the SCC, because source nodes do not have incoming edges from unscheduled nodes.

In step 608, the acyclic graph that results from steps 602-606 is used for forming a schedule that is executed. For example, the acyclic graph may be used for populating a schedule object, which is returned by the Call Interface (CI) (e.g., an Oracle Call Interface (OCI)) to the PL/SQL engine. The refresh graph structure may be passed to the calling SQL function and used for executing the refresh using the CI. However, in alternative embodiments, the schedule may be implemented in other manners.

Example of an Application of the Method of Building a Refresh Graph

Figure 7A:
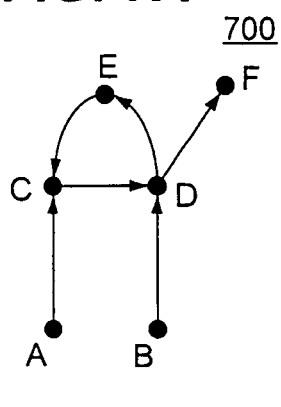
FIG. 7 is an example of a graph that may result after applying one of the steps of the method of FIG. 6.

FIG. 7A is an example of a graph 700 that may result from applying step 602. Graph 700 includes base nodes A and B. Graph 700 also includes a cycle formed by nodes C, D, and E forming an SCC, which may be detected in step 604. In an embodiment, the determination that the SCC is best refreshed against nodes A and B may not be made until the algorithm is ready to schedule the SCC nodes, which in a different example, may be after several other nodes have been scheduled.

Figure 7B:
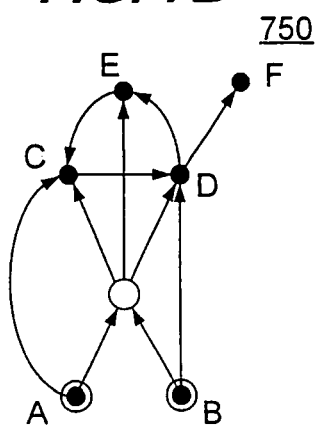

FIG. 7B is an example of a graph 750 that may result after step 604 is completed. Node S is added to the graph. Node S is a dummy node and is located so that outgoing edges lead from node S to each node in the SCC, which are nodes C-E. Additionally, both source nodes A and B have outgoing edges to node S. In an embodiment, no edges of the SCC nodes are removed prior to or upon adding node S. In this embodiment, edges of the SCC nodes are not removed until after a determination is made as to which SCC node to schedule first.

As part of step 606, first the source nodes A and B are scheduled. In FIGS. 7B and 8-10, the scheduling of a node (which may also be referred to as the anchoring of a node) is represented in the schedule by a ring around the node. In FIG. 7B nodes A and B are represented as already being scheduled. The next nodes in the graph are all SCC nodes. A heuristic rule is used to select the first SCC node to schedule.

Figure 8:
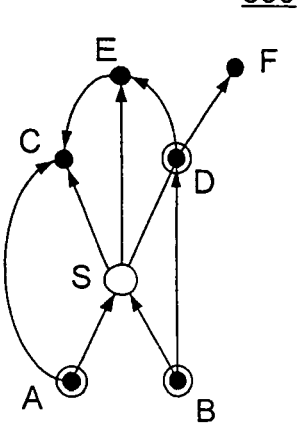
FIG. 8 is an example of a graph that may result after applying another of the steps of the method of FIG. 6.

In FIG. 8, node D is depicted as being scheduled. Using the heuristic discussed above, scheduling node C first has a score of one, because only node D becomes a source node. Scheduling node D first has a score of two, because nodes E and F become source nodes. Consequently, node D would be scheduled first using the above heuristic. The heuristic rule removes the incoming edges connecting from node C to D and from node S to D. The edge connecting node D and S may be removed when node D is scheduled, because node S is a dummy node, and it is never actually used as a rewrite basis for updating an MV. Consequently, the incoming edge from node S to node D may be removed, because node S will not used for updating node D. Node F is now a source node.

Figure 9:
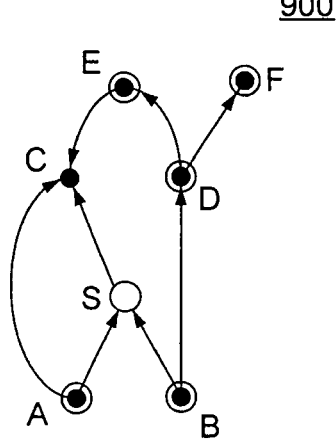
FIG. 9 is an example of the graph of FIG. 8 after being modified as a result of node D being scheduled.
Figure 10:
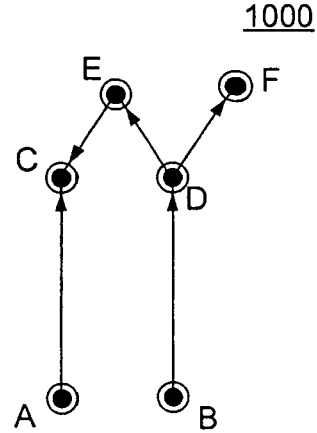
FIG. 10 is and example of the graph of FIG. 9 after being modified as a result of nodes E and F being scheduled.

FIG. 9 illustrates the graph after node E and F have been scheduled. Since node S is a dummy node and node E is now scheduled the edge connecting nodes E and S may be removed. Node E is now a source node FIG. 10 illustrates the graph after node C is scheduled. Since node C is scheduled the incoming edge from node S may be removed. Since node S is a dummy node it does not actually need to be refreshed, and may now be removed from the graph.

In an alternative embodiment (using a different heuristic rule), the heuristic rule may have scheduled node C first and removed the edge connecting nodes D and C and the edge connecting nodes C and S. In an alternative embodiment, after the cycle is broken by removing either the edges connecting nodes C and E or nodes D and E, a cost analysis is performed to determine whether it is more cost effective to schedule node D first and use node D to refresh node C or to schedule node C first and use node C to refresh node D.

In an embodiment, a criterion that is incorporated into the heuristic rules is to keep the maximum path length relatively low or to a minimum, while still keeping the amount of refreshing that is performed via rewriting relatively high or at a maximum.

Collection Object

In an embodiment, if only a single MV is refreshed at any given time, then graph analysis may be skipped entirely. For a single MV, the refresh scheduling algorithm may be a C callback into the kernel from the SQL refresh procedures. If multiple MVs are refreshed one at a time, the procedure may return the refresh graph as a two-tiered integer-indexed collection, with each MV represented at the first tier, and its dependencies represented at the second tier. Each element in the first tier represents an MV and may contain an identifier, such as a name for the MV, optimizer cost of the MV's refresh expression (which may include an MV rewrite if enabled), and other accounting information from the kernel. The dependencies are stored in a table object, which may include a list of the identifiers (e.g., names) of other nodes that a given MV is dependent on. The list may be modified by deleting and inserting identifiers of other nodes into the table object, so that the dependencies may be modified, and different graphs may be constructed. Consequently, in an embodiment table objects are used for storing the dependencies of the graph.

Figure 11:
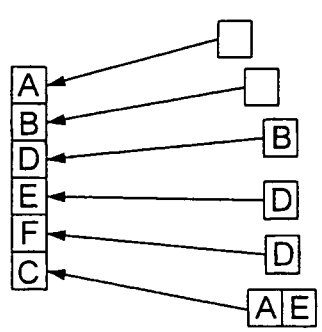
FIG. 11 represents a collection object used in scheduling the refresh of the MVs of FIG. 10.

FIG. 11 represents a collection object 1100 used in scheduling the refresh of the MVs. Now that the schedule has been established, as indicated in the graph of FIG. 10, the graph may be converted into a collection object and return the collection object to the calling SQL function. The collection object may be an array that is stored such that the ordering represents a serialization of the entire schedule. The serialization of the schedule allows the schedule to be run with the determined, relatively optimal ordering by iterating through the array in cases where concurrent execution of the refreshing in the schedule is impossible or undesirable. The collection object records the dependencies by using the incoming edges of each node.

Based on the node graph 1000 (see FIG. 10), nodes A and B have no incoming edges, and consequently array elements A and B in collection object 1100 have empty dependency lists. Node D has one incoming edge, which is from node B, and consequently array element D is connected to a box labeled B. Both nodes E and F each have one incoming edge, which are both from node D, and consequently array elements E and F are each connected to a different array element labeled D. Node C has two edges from node A and E, and consequently element C is connected to array elements labeled A and E.

Pseudocode for an Algorithm Implementing the Method of Building a Refresh Graph

```
Schedule ScheduleRefresh(RefreshList L)
(
    Graph G = BuildGraph(L);
    ScheduleGraph(G);
    return G;
)
Graph BuildGraph(RefreshList L)
(
    /* Create the nodes for the graph */
    For each MV M_i in L:
        Create Node N_i in Graph G;
        /* Find best refresh expression and add edges */
        /* First add nested MV edges */
    For each N_i in G:
        if N_i is a nested MV in N_j, add edge between N_i and N_j
        and mark as
```

-continued

```
        a hard edge
        /* Then add best refresh edges */
    If query rewrite is enabled:
        For each N_i in G:
            R = FindBestRefresh(N_i, L);
            /* Add edges */
        For each table T in R:
            if T = MV_j in L, add edge from MV_j to MV_i
            /* Find all SCCs, and replace all SCCs with size > 1 with a
            special SCC node */
        GroupSCCs(G);
    return G;
)
```

RefreshExpr FindBestRefresh(Node N, RefreshList L)

(
/* Generating a particular refresh expression is appropriate when the MV has the capability for that kind of refresh and the user has not specially requested a specific refresh strategy. For example, generating PCT refresh with truncate is appropriate if the MV contains partitioning key of base table, and the user has not requested atomic refresh or requested a specific refresh method.

In the case where MVs have not been built yet, (and possibly after large changes), the cost estimate for the rewrite will be inaccurate, because MV container will be empty. In this case, the cost may be estimated based on the cardinality of the query defining the MV. In cases of nested MVs, the cardinality may be recursively found, if the underlying MV has also not yet built (or has changed radically). The rewrite code may be changed to request the optimizer cardinality estimates rather than size of the MV in this case. This optimizer cost will also be used to chose the best refresh method.
*/ if appropriate generate conventional fast refresh expressions and:
    compile and determine the cost of the expressions, saving the best cost expression if appropriate generate PCT refresh expressions w/truncate and:
    compile and determine the cost of the expressions, using a rewrite against MVs in L if the cost is better than the best cost, replace the best expression with the current expression so that the current expression becomes the best expression if appropriate generate PCT refresh expressions w/delete and:
    compile and cost the expressions, using rewrite against the MVs in L
    if cost is better than the best cost, replace the best expression with the current expression so that the current expression becomes the best expression generate complete refresh expression and:
    compile and cost the expression, using rewrite against L
    if cost is better than best replace the best expression with the current expression so that the current expression becomes the best expression return best expression;

)

```
/* Grouping SCCs will make the resulting graph acyclic */
void GroupSCCs(Graph G)
(
List Order = NULL;
/* First, Depth First Search (DFS) post order traversal */
For each Node N_i in G:
DFSVisit(N_i, Order);
/* Then build the SCC on second DFS traversal: */
For each Node N_i in Order:
SCC S = NULL, depth = 0
SCCBuild(N, S, depth)
)
void DFSVisit(Node N, List Order)
(
If N has been visited by DFSVisit, return
Mark N as visited by DFSVisit
For each Node N_i in outgoing list of edges of N:
      DFSVisit(N_i, Order)
      Push N Onto Order
)
void SCCBuild(Node N, SCC *S, int depth)
(
If N has been visited by SCCBuild, return
Mark N as visited by SCCBuild
/* Use transpose graph */
For each Node N_i in the incoming edge list of N:
      SCCBuild(N_i, S, depth + 1)
      /* If this is an SCC of size 1, leave it alone: */
      if (depth == 0 && !(*S))
return
/* if it is greater than size 1, and no SCC has been created yet,
      create one */
if (depth > 0 && !(*S))
      (*S) = AllocateSCC( )
/* Collapse graph node into SCC */
For each Node N_i in incoming list of edges of N:
      if(N_i not also part of SCC S)
            add N_i to incoming edge list of S
            add S to outgoing edge list of N_i
/* if incoming list of edges of SCC is empty, this is a disconnected
component. */
)
Schedule ScheduleGraph (Graph G)
(
List Sources = FindSources(G->nodes), NewSources = NULL
While TRUE:
     if Sources is EMPTY, break
     for each node N_i in Sources:
          if N_i is MV,
                ScheduleNode(N_i, G, Sources, NewSources)
     if no nodes in Sources are MVs:
          ScheduleSCC(first node in Sources, G, Sources, NewSources)
     Sources = NewSources, NewSources = NULL
)
void FindSources (Nodelist L)
(
For each N_i in L
     if N_i's incoming edge list has only scheduled nodes or dummy SCC nodes,
          add to Sources
return Sources
)
void ScheduleNode (Node N, Graph G, List Src, List NSrc)
(
Remove N from Src
Mark N as scheduled
For each N_i in incoming list of edges of N:
     if N_i has not been scheduled, destroy edge between N and N_i
     For each N_i in outgoing list of edges of N:
          if N_i has no unscheduled incoming edges, add N_i to NewSources
     Add N->mv to G->ScheduledMVList
)
void ScheduleSCC(Node N, Graph G, List Src, List NSrc)
(
boolean FoundSource = FALSE;
/* First, try to find source nodes (cycle may already be broken) */
For each N_i in N's SCC list:
     if N_i has no unscheduled incoming edges other than SCC edge,
          FoundSource = TRUE;
          ScheduleNode(N, G, Src, NSrc)
```

```
if N's SCC list is empty,
    remove N from G, and return
if FoundSource, return
/* Otherwise, find best heuristic node and schedule it */
BestNode = HeuristicForSCC(N, G)
Delete BestNode from N's SCC list
Recompute Best Refresh edges for BestNode vs. scheduled nodes in G, where the
    scheduling was performed using G->ScheduledMVList
ScheduleNode(BestNode, G, Src, NSrc)
/* We may want to also adjust the SCC here, breaking it into
smaller SCCs if possible. May not be necessary */
)
HeuristicForSCC(Node N, Graph G)
(
/* Calculate how many other nodes each node will free. This is a different heuristic than
described above */
For each N_i in N's SCC list:
    Store the value of CalcFree(N_i)
Find the node with highest freed source nodes
return best node
)
int CalcFree(Node N)
(
int willfree
if already marked as visited by CalcFree, return 0
mark N as visited by CalcFree
/* otherwise, N is a newly freed source */
willfree = 1
For each N_i in N's outgoing edge list:
    if (all of N_i's incoming edges are from marked nodes)
        willfree += CalcFree(N_i)
return willfree
)
```

Allocation of Resources During Execution of a Refresh Schedule

When an atomic refresh is requested, or when concurrent execution is unavailable, the queries associated with the MVs are executed one-at-a-time in the order in which MVs appear in a schedule array (the schedule array represents a serialization of the schedule). In an embodiment, however, an approach is used that maximizes the use of resources while allowing the use of rewrites to improve performance, by leveraging both parallel execution of individual refreshes and the concurrent execution of multiple refreshes, without overloading the available resources. Based on experimental observation, due to imperfect scaling during parallelization, the cost of refreshing a given large MV tends to be reduced mainly via the parallelization of the processing of the large or costly MV, whereas the cost of processing a given set of smaller MVs tends to be reduced mainly via concurrently refreshing multiple MVs of the set. In this context, a large MV and a small MV are determined based on the number of rows that need to be refreshed and/or the cost of refreshing the MV. Parallel processing of some smaller (e.g., less costly) MVs may even increase the cost of processing the smaller MVs.

Concurrent execution of the schedule may be implemented by traversing the graph starting at the source nodes (nodes with no incoming dependencies, i.e. MVs that refresh against the base tables or fresh MVs only) and then repeatedly refreshing nodes in the order in which they appear in the graph, while removing from the graph those nodes that have been refreshed, and thereby revealing (creating) new sources. Additionally, new MVs are allocated resources as resources become available. The resource constraints that regulate concurrent and parallel execution of MVS are the number of concurrent processes allowed and the number of resources available for parallel execution.

In an embodiment, a cost threshold is set for determining whether to classify an MV as large. If the cost of refreshing the MV is above the threshold, the MV is considered to be large. If the cost is below the threshold, the MV is not considered to be large. Concurrent execution of large MVs is avoided to prevent strain on system resources. Instead, the entire refresh of a large MV is performed with a high degree of parallelism. Any nodes that are found to include large MVs are refreshed immediately. In an embodiment, an MV that is not classified as large is classified as small. In an embodiment, the threshold is settable by a database administrator. In an embodiment, a default threshold for determining whether an MV is large may be determined based on the available resources in addition to the estimated cost of refreshing the MV and/or the amount of data that needs to be updated.

When no large MVs are available for execution, these smaller MVs may be refreshed concurrently with one another when they are available as source nodes. The allocation of resources may involve estimating an appropriate degree of parallelism for each MV. A percentage of the resources may be allocated to each MV in proportion to the degree of parallelism that is appropriate for that MV, such that all or essentially all parallel resources are allocated across all the concurrent jobs being performed. For example, consider three MVs X, Y, and Z that are scheduled to be refreshed concurrently. Assume that it has been determined that the degree of parallelism appropriate for Y is four times that of X, and the degree of parallelism appropriate for Z is five times that of X. Then MVs X, Y, and Z may be allocated 10%, 40%, and 50% of the resources, respectfully.

Pseudocode for Schedule Execution with Automatic Adjustments for Parallelism

```
dbms_pipe.create_pipe(pipe, ... )
WHILE there are unrefreshed MVs in schedule
    build source list from schedule
    if any source MV is very large and no jobs are running,
        refresh here with full parallel
    else if all source MVs are small,
        calculate parallelism by comparing cost relative to other MVs
        get MVs from source list in order from most to least costly
        for each MV in this order:
            add cost to running total of costs for this source list
            if (if ((MV cost) / (total cost)) *( available resources)>
            available
                resources,
                or # of MVs in list > available jobs,
                discard the MV from the list
            assign parallel resources to remaining MVs in list based on
                ((MV cost) / (total cost)) * (available resources) /*
                for example
                    (resources assigned to MV):=((MV cost) / (total
                    cost)) *
                    (available resources)) */
        build jobs for each MV refresh:
            jobtext := 'DBMS_SNAPSHOT.REFRESH_MV
            (pipe, ... , rscs for
                MV);
            dbms_job.submit(j, jobtext, ... );
            available resources := available resources - resources
            assigned to
                MV
            available jobs := available jobs - 1
        WHILE jobs are pending LOOP
            receive message from pipe that an MV has completed being
                refreshed
            unparse MV name, rscs used from message
            available resources := available resources + rscs
                for this MV
            available jobs := available jobs + 1
            remove MV from schedule, revealing new sources
        END LOOP;
    end if;
END LOOP;
```

Hardware Overview

Figure 12:
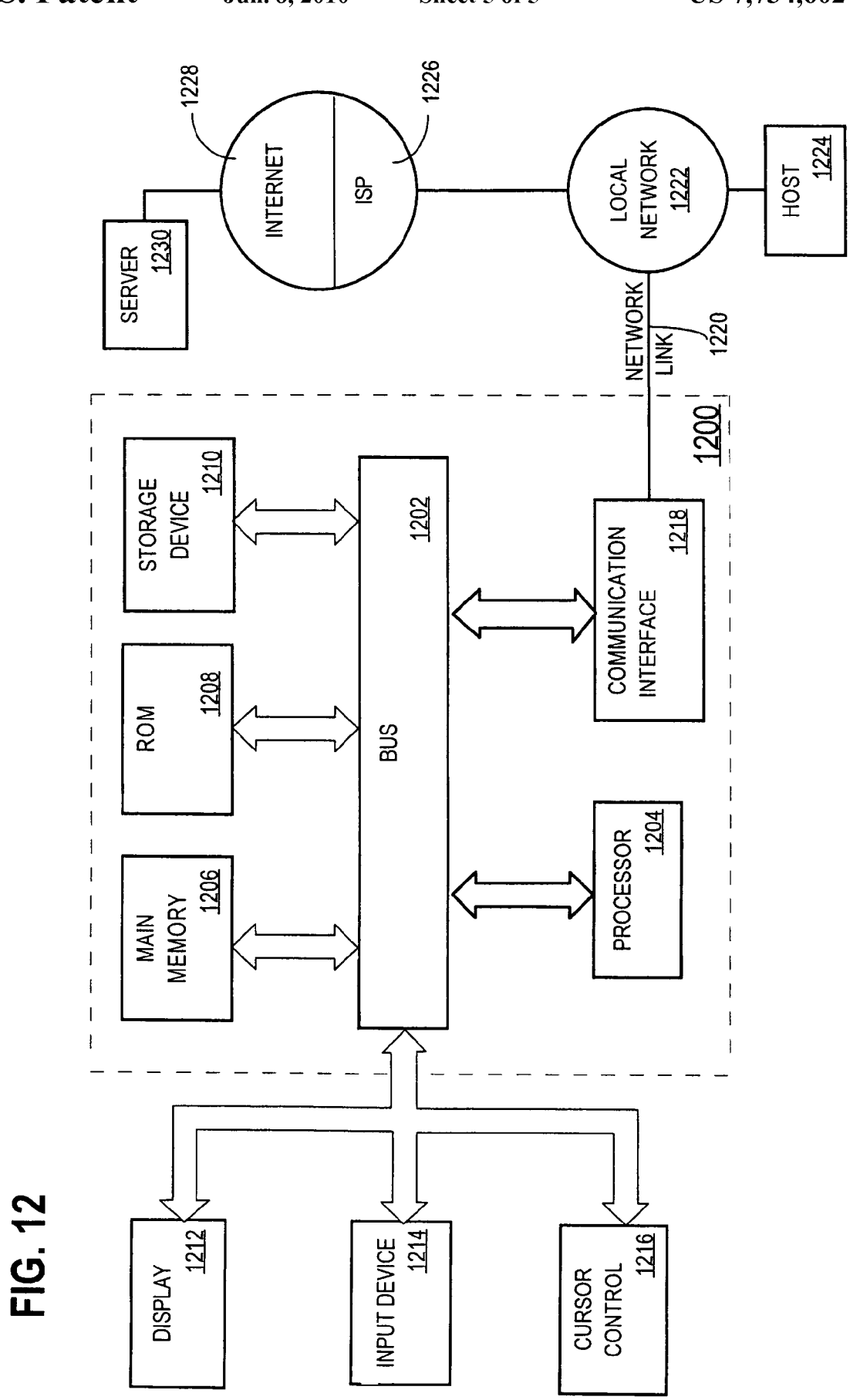
FIG. 12 is a block diagram that illustrates a computer system that may be used in implementing an embodiment of the present invention.

FIG. 12 is a block diagram that illustrates a computer system 1200 upon which an embodiment of the invention may be implemented. Computer system 1200 may be used as a database and/or database server or a separate unit for the database and database server. Computer system 1200 includes a bus 1202 or other communication mechanism for communicating information, and a processor 1204 coupled with bus 1202 for processing information. Computer system 1200 also includes a main memory 1206, such as a random access memory (RAM) or other dynamic storage device, coupled to bus 1202 for storing information and instructions to be executed by processor 1204. Main memory 1206 also may be used for storing temporary variables or other intermediate information during execution of instructions to be executed by processor 1204. Computer system 1200 further includes a read only memory (ROM) 1208 or other static storage device coupled to bus 1202 for storing static information and instructions for processor 1204. A storage device 1210, such as a magnetic disk or optical disk, is provided and coupled to bus 1202 for storing information and instructions.

Computer system 1200 may be coupled via bus 1202 to a display 1212, such as a cathode ray tube (CRT), for displaying information to a computer user. An input device 1214, including alphanumeric and other keys, is coupled to bus 1202 for communicating information and command selections to processor 1204. Another type of user input device is cursor control 1216, such as a mouse, a trackball, or cursor direction keys for communicating direction information and command selections to processor 1204 and for controlling cursor movement on display 1212. This input device typically has two degrees of freedom in two axes, a first axis (e.g., x) and a second axis (e.g., y), that allows the device to specify positions in a plane.

The invention is related to the use of computer system 1200 for reducing costs associated refreshing a set of one or more materialized views. Computer system 1200 is just one example of a machine for reducing costs associated refreshing a set of one or more materialized views. According to one embodiment of the invention, reducing costs associated refreshing a set of one or more materialized views is provided by computer system 1200 in response to processor 1204 executing one or more sequences of one or more instructions contained in main memory 1206. Such instructions may be read into main memory 1206 from another computer-readable medium, such as storage device 1210. Execution of the sequences of instructions contained in main memory 1206 causes processor 1204 to perform the process steps described herein. One or more processors in a multi-processing arrangement may also be employed to execute the sequences of instructions contained in main memory 1206. In alternative embodiments, hard-wired circuitry may be used in place of or in combination with software instructions to implement the invention. Thus, embodiments of the invention are not limited to any specific combination of hardware circuitry and software.

The term "computer-readable medium" as used herein refers to any medium that participates in providing instructions to processor 1204 for execution. Such a medium may take many forms, including but not limited to, non-volatile media, volatile media, and transmission media. Non-volatile media includes, for example, optical or magnetic disks, such as storage device 1210. Volatile media includes dynamic memory, such as main memory 1206. Transmission media includes coaxial cables, copper wire and fiber optics, including the wires that comprise bus 1202. Transmission media can also take the form of acoustic or light waves, such as those generated during radio wave and infrared data communications.

Common forms of computer-readable media include, for example, a floppy disk, a flexible disk, hard disk, magnetic tape, or any other magnetic medium, a CD-ROM, any other optical medium, punch cards, paper tape, any other physical medium with patterns of holes, a RAM, a PROM, an EPROM, a FLASH-EPROM, any other memory chip or cartridge, a carrier wave as described hereinafter, or any other medium from which a computer can read.

Various forms of computer readable media may be involved in carrying one or more sequences of one or more instructions to processor 1204 for execution. For example, the instructions may initially be carried on a magnetic disk of a remote computer. The remote computer can load the instructions into its dynamic memory and send the instructions over a telephone line using a modem. A modem local to computer system 1200 can receive the data on the telephone line and use an infrared transmitter to convert the data to an infrared signal. An infrared detector coupled to bus 1202 can receive the data carried in the infrared signal and place the data on bus 1202. Bus 1202 carries the data to main memory 1206, from which processor 1204 retrieves and executes the instructions. The instructions received by main memory 1206 may optionally be stored on storage device 1210 either before or after execution by processor 1204. Computer readable media are just one example of machine-readable media that may be used for carrying the instructions for implementing any of the methods described herein.

Computer system 1200 also includes a communication interface 1218 coupled to bus 1202. Communication interface 1218 provides a two-way data communication coupling to a network link 1220 that is connected to a local network 1222. For example, communication interface 1218 may be an integrated services digital network (ISDN) card or a modem to provide a data communication connection to a corresponding type of telephone line. As another example, communication interface 1218 may be a local area network (LAN) card to provide a data communication connection to a compatible LAN. Wireless links may also be implemented. In any such implementation, communication interface 1218 sends and receives electrical, electromagnetic or optical signals that carry digital data streams representing various types of information.

Network link 1220 typically provides data communication through one or more networks to other data devices. For example, network link 1220 may provide a connection through local network 1222 to a host computer 1224 or to data equipment operated by an Internet Service Provider (ISP) 1226. ISP 1226 in turn provides data communication services through the worldwide packet data communication network now commonly referred to as the "Internet" 1228. Local network 1222 and Internet 1228 both use electrical, electromagnetic or optical signals that carry digital data streams. The signals through the various networks and the signals on network link 1220 and through communication interface 1218, which carry the digital data to and from computer system 1200, are exemplary forms of carrier waves transporting the information.

Computer system 1200 can send messages and receive data, including program code, through the network(s), network link 1220 and communication interface 1218. In the Internet example, a server 1230 might transmit a requested code for an application program through Internet 1228, ISP 1226, local network 1222 and communication interface 1218. In accordance with the invention, one such downloaded application provides for reducing costs associated refreshing a set of one or more materialized views as described herein.

The received code may be executed by processor 1204 as it is received, and/or stored in storage device 1210, or other non-volatile storage for later execution. In this manner, computer system 1200 may obtain application code in the form of a carrier wave.

In the foregoing specification, embodiments of the invention have been described with reference to numerous specific details that may vary from implementation to implementation. Thus, the sole and exclusive indicator of what is the invention, and is intended by the applicants to be the invention, is the set of claims that issue from this application, in the specific form in which such claims issue, including any subsequent correction. Any definitions expressly set forth herein for terms contained in such claims shall govern the meaning of such terms as used in the claims. Hence, no limitation, element, property, feature, advantage or attribute that is not expressly recited in a claim should limit the scope of such claim in any way. The specification and drawings are, accordingly, to be regarded in an illustrative rather than a restrictive sense.

The invention claimed is:

1. A method for refreshing indexes of a materialized view in a database system, the method comprising:
   determining whether an incremental refresh of the materialized view satisfies one or more criteria, wherein an index on the materialized view is refreshable by incrementally refreshing the index as the incremental refresh of the materialized view is being performed or by delayed maintenance of the index until after the materialized view is refreshed;
   wherein the index is not any materialized view that is referable as a table in database statements that are executable by the database system;
   when the one or more criteria are satisfied,
      disabling incremental updating of the index, refreshing the materialized view, and, after refreshing the materialized view, performing the delayed maintenance of the index;
   when the one or more criteria are not satisfied, incrementally refreshing the index as the incremental refresh of the materialized view is being performed;
   wherein the method is performed by one or more computer systems.

2. The method of claim 1, wherein the one or more criteria include at least a threshold of an amount that is changed of a partition of the materialized view that affects the index.

3. The method of claim 2, wherein the threshold is 10%, and satisfying the one or more criteria includes at least changing more than 10% of a partition that affects the index.

4. The method of claim 2, wherein the threshold is a percentage selected from the range of 10% to 15%, and satisfying the one or more criteria includes at least changing more than the percentage selected of a partition that affects the index.

5. The method of claim 1, wherein when the one or more criteria are satisfied, the index is marked as unusable prior to incrementally refreshing the materialized view.

6. The method of claim 1, wherein when the one or more criteria are satisfied, the index is disabled prior to incrementally refreshing the materialized view.

7. The method of claim 1, wherein the delayed maintenance of the index is performed after committing all changes to rows of a partition that affect the index of the materialized view.

8. The method of claim 1, wherein performing the delayed maintenance of the index further comprises rebuilding the index.

9. A machine-readable storage medium storing one or more sequences of instructions, which when executed by one or more processors, causes the one or more processors to perform a method for refreshing indexes of a materialized view in a database system, the method comprising:
   determining whether an incremental refresh of the materialized view satisfies one or more criteria, wherein an index on the materialized view is refreshable by incrementally refreshing the index as the incremental refresh of the materialized view is being performed or by delayed maintenance of the index until after the materialized view is refreshed;
   wherein the index is not any materialized view that is referable as a table in database statements that are executable by the database system;
   when the one or more criteria are satisfied,
      disabling incremental updating of the index, refreshing the materialized view, and, after refreshing the materialized view, performing the delayed maintenance of the index;
   when the one or more criteria are not satisfied, incrementally refreshing the index as the incremental refresh of the materialized view is being performed.

10. The machine-readable storage medium of claim 9, wherein the one or more criteria include at least a threshold of an amount that is changed of a partition of the materialized view that affects the index.

11. The machine-readable storage medium of claim 10, wherein the threshold is 10% and satisfying the one or more criteria includes at least changing more than 10% of a partition that affects the index.

12. The machine-readable storage medium of claim 10, wherein the threshold is a percentage selected from the range of 10% to 15%, and satisfying the one or more criteria includes at least changing more than the percentage selected of a partition that affects the index.

13. The machine-readable storage medium of claim 9, wherein when the one or more criteria are satisfied, the index is marked as unusable prior to incrementally refreshing the materialized view.

14. The machine-readable storage medium of claim 9, wherein when the one or more criteria are satisfied, the index is disabled prior to incrementally refreshing the materialized view.

15. The machine-readable storage medium of claim 9, wherein the delayed maintenance of the index is performed after committing all changes to rows of a partition that affect the index of the materialized view.

16. The machine-readable storage medium of claim 9, wherein performing the delayed maintenance of the index further comprises rebuilding the index.

* * * * *

UNITED STATES PATENT AND TRADEMARK OFFICE
CERTIFICATE OF CORRECTION

PATENT NO. : 7,734,602 B2
APPLICATION NO. : 11/083804
DATED : June 8, 2010
INVENTOR(S) : Nathaniel Keith Folkert et al.

Page 1 of 1

It is certified that error appears in the above-identified patent and that said Letters Patent is hereby corrected as shown below:

On page 3, in column 1, under "Other Publications", line 51, delete "Preemptble" and insert -- Preemptible --, therefor.

On page 3, in column 2, under "Other Publications", line 50, delete "Cybernetifcs," and insert -- Cybernetics, --, therefor.

On sheet 3 of 5, in Figure 6, Box no. 604, line 3, delete "Connectiong" and insert -- Connecting --, therefor.

In column 7, line 65, delete "ate" and insert -- are --, therefor.

In column 7, line 67, after "maintenance" insert -- . --.

In column 16, line 49, after "node" insert -- . --.

In column 27, line 6, in claim 11, delete "10%" and insert -- 10%, --, therefor.

Signed and Sealed this
Second Day of August, 2011

David J. Kappos
*Director of the United States Patent and Trademark Office*